(12) United States Patent
Saseendran et al.

(10) Patent No.: US 12,093,345 B2
(45) Date of Patent: Sep. 17, 2024

(54) GENERATOR NETWORKS FOR GENERATING IMAGES WITH PREDETERMINED COUNTS OF OBJECTS

(71) Applicant: Robert Bosch GmbH, Stuttgart (DE)

(72) Inventors: Amrutha Saseendran, Renningen (DE); Kathrin Skubch, Frankfurt (DE); Margret Keuper, Mannheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 624 days.

(21) Appl. No.: 17/445,440

(22) Filed: Aug. 19, 2021

(65) Prior Publication Data
US 2022/0101056 A1 Mar. 31, 2022

(30) Foreign Application Priority Data
Sep. 30, 2020 (EP) .................... 20199265

(51) Int. Cl.
*G06F 18/214* (2023.01)
*G06F 18/2132* (2023.01)
(Continued)

(52) U.S. Cl.
CPC ...... *G06F 18/2148* (2023.01); *G06F 18/2132* (2023.01); *G06F 18/2413* (2023.01);
(Continued)

(58) Field of Classification Search
CPC ............. G06F 18/2148; G06F 18/2132; G06F 18/2413; G06F 18/28; G06N 3/045; G06N 3/088
See application file for complete search history.

(56) References Cited

U.S. PATENT DOCUMENTS

2019/0198156 A1 6/2019 Madani et al.

FOREIGN PATENT DOCUMENTS

DE 102018204494 B3 8/2019

OTHER PUBLICATIONS

Bolluyt, Elijah, and Cristina Comaniciu. "Collapse resistant deep convolutional GAN for multi-object image generation." 2019 18th IEEE International Conference on Machine Learning and Applications (ICMLA). IEEE, 2019. (Year: 2019).*

(Continued)

*Primary Examiner* — David Perlman
(74) *Attorney, Agent, or Firm* — NORTON ROSE FULBRIGHT US LLP; Gerard A. Messina

(57) ABSTRACT

A method for training a generator network that is configured to generate images with multiple objects. The method includes providing a set of training images, a generator network, and a discriminator network; drawing noise samples and target counts of objects; mapping, by the generator network, the noise samples and target counts of objects to generated images; randomly drawing images from a pool comprising generated images and training images; supplying the randomly drawn images to the discriminator network, thereby mapping them to a combination of: a decision whether the respective image is a training image or a generated image; optimizing discriminator parameters, optimizing generator parameters, and optimizing both the generator parameters and the discriminator parameters with the goal of improving the match between the predicted count of objects on the one hand, and the actual or target count of objects on the other hand.

14 Claims, 3 Drawing Sheets

(51) Int. Cl.
  *G06F 18/2413* (2023.01)
  *G06F 18/28* (2023.01)
  *G06N 3/045* (2023.01)
  *G06N 3/088* (2023.01)

(52) U.S. Cl.
  CPC ............. *G06F 18/28* (2023.01); *G06N 3/045* (2023.01); *G06N 3/088* (2013.01)

(56) References Cited

OTHER PUBLICATIONS

Hinz, Tobias, Stefan Heinrich, and Stefan Wermter. "Generating multiple objects at spatially distinct locations." arXiv preprint arXiv: 1901.00686 (2019). (Year: 2019).*

Valerio Giuffrida, Mario, Hanno Scharr, and Sotirios A. Tsaftaris. "Arigan: Synthetic arabidopsis plants using generative adversarial network." Proceedings of the IEEE international conference on computer vision workshops. 2017. (Year: 2017).*

* cited by examiner ized to a combination of: a decision whether the image is a training image or a generated image produced by the generator network, and at least one predicted count of objects in the image. Again, the predicted count of objects may be a multi-class count vector. The discriminator network is only needed during training. After the training, the finished generator network may be used on its own.

GENERATOR NETWORKS FOR GENERATING IMAGES WITH PREDETERMINED COUNTS OF OBJECTS

CROSS REFERENCE

The present application claims the benefit under 35 U.S.C. § 119 of European Patent Application No. EP 20199265.8 filed on Sep. 30, 2020, which is expressly incorporated herein by reference it is entirety.

FIELD

The present invention relates to the adversarial training of generator networks for producing synthetic images that may, inter alia, be used for training image classifiers or for obtaining spatial designs of machines.

BACKGROUND INFORMATION

Image classifiers need to be trained with training images for which "true" classification scores that the classifier should assign to the respective image are known. Obtaining a large set of training images with sufficient variability is time-consuming and expensive. For example, if the image classifier is to classify traffic situations captured with one or more sensors carried by a vehicle, long test drives are required to obtain a sufficient quantity of training images. The "true" classification scores needed for the training frequently need to be obtained by manually annotating the training images, which is also time-consuming and expensive. Moreover, some traffic situations, such as a snow storm, occur only rarely during the capturing of the training images.

To alleviate the scarcity of training images, generative adversarial networks (GANs) may be trained to generate synthetic images that look like real images and may be used as training images for image classifiers. Conditional GANs (cGANs) may be used to generate synthetic images that belong to a certain mode of the distribution of realistic images. For example, a conditional GAN may generate synthetic images that belong to a particular class of the classification.

German Patent Application No. DE 10 2018 204 494 B3 describes a method for generating synthetic radar signals as training material for classifiers.

SUMMARY

In accordance with the present invention, a method for training a generator network that is configured to generate images with multiple objects is provided.

In accordance with an example embodiment of the present invention, in the course of this method, a set of training images is provided. Also, for each training image, at least one actual count of objects that the respective training image contains is provided. In particular, this actual count of objects may be a multi-class count vector that comprises separate counts for multiple classes of objects.

Also, a generator network is provided that is configured to map a combination of a noise sample and at least one target count of objects to a generated image. Such a generator network may, for example, be produced from a generator network that is configured to map a noise sample to a generated image. For example, the input layer of such an existing generator network may be modified to accommodate the inputting of a target count. Like the actual count, the target count may be a multi-class count vector.

In accordance with an example embodiment of the present invention, a discriminator network is provided. This discriminator network is configured to map an image to a combination of: a decision whether the image is a training image or a generated image produced by the generator network, and at least one predicted count of objects in the image. Again, the predicted count of objects may be a multi-class count vector. The discriminator network is only needed during training. After the training, the finished generator network may be used on its own.

For training, noise samples and target counts of objects are randomly drawn. Using the generator network, these noise samples and target counts of objects are mapped to generated images.

The generated images are pooled together with training images. From this pool, images are randomly drawn and supplied to the discriminator network. For each drawn image, the discriminator network outputs a decision whether the respective image is a training image or a generated image, and also at least one predicted count of objects in this image. This predicted count may also be a multi-class count vector.

Discriminator parameters that characterize the behavior of the discriminator network are optimized with the goal of improving the accuracy with which the discriminator network distinguishes between generated images and training images. In tandem with this, generator parameters that characterize the behavior of the generator network with the goal of deteriorating said accuracy.

This part of the training is adversarial: Through constant competition, the generator network is trained to generate ever better "forgeries" with which to "fool" the discriminator network, and the discriminator network is trained to become ever more adept at spotting these "forgeries".

On top of this adversarial training, both the generator parameters and the discriminator parameters are trained with the goal of improving the match between the predicted count of objects on the one hand, and the actual or target count of objects on the other hand. That is, if the image that is inputted to the discriminator network is a training image, the actual count of objects known for this training image is compared with the predicted count of objects. If the image that is inputted to the discriminator network is a generated image, the target count of objects used to generate this generated image is compared with the predicted counts of objects.

This part of the training is not strictly adversarial. Rather, the generator network and the discriminator network work hand in hand here to improve the match: Based on the training images for which the actual count of objects is known, the discriminator network learns to accurately predict this count of object. This capability of the discriminator network is in turn used as a measurement instrument to determine whether the generator network has produced an image that contains the count of objects as requested by the target count. Like in the adversarial part of the training, the discriminator network is still rating something that the generator network is doing. However, the intention of the generator network is not to "fool" the discriminator network, but to do earnestly make something better as per the rating by the discriminator network.

The possibility to generate images with desired counts of objects allows to produce images with richer and more realistic scenes. Many realistic scenes comprise more than one object of at least one type. When image classifiers are being trained to evaluate realistic scenes, e.g., in order to drive a vehicle in an at least partially automated manner, it is therefore important that the classifiers output adequate results if multiple objects are present in the scene. For example, most traffic scenes comprise multiple mobile objects (such as other vehicles or pedestrians). Also, traffic signs frequently appear in groups in one single place, and they all have to be processed correctly in order to determine the appropriate behavior for the vehicle. For example, in one single place, there may be a speed limit of 30 km/h posted together with an indication that this is valid at night between 21.00 and 5.00 hours. A higher speed limit of 50 km/h may be in effect during daytime between 5.00 and 21.00 hours. On top of this, there may be a no-entry sign combined with the indication that this applies only to vehicles of 3.5 tons and above.

In accordance with an example embodiment of the present invention, the generator network trained according to the method described here may produce realistic images of arbitrary scenarios for which the correct semantic meaning, i.e., the "ground truth", is already known because the images were generated based on this in the first place. Therefore, a large set of training images for the image classifier may be produced without having to manually annotate or "label" them with the correct semantic meaning.

In an analogous manner to the generator network, the discriminator network used during the training may be produced from an existing GAN discriminator network by modifying the output layer, which previously only outputted a decision whether the inputted image is a "real" training image or a generated "fake" image, so that it now also outputs the at least one predicted count of objects.

However, in a particularly advantageous embodiment, the discriminator network comprises:
  a first network comprising a plurality of convolutional layers and a classification layer that is configured to map the outcome of these convolutional layers to the decision whether an image inputted to the discriminator network is a training image or a generated image; and
  a second network comprising a plurality of convolutional layers and a regression layer that is configured to map the outcome of these convolutional layers to the at least one predicted count of objects in the image.

In this manner, each of the first and second networks may specialize on its respective task with a maximum amount of flexibility. If the first network and the second network are completely independent from each other, no trade-offs between an optimal distinguishing of generated images from training images on the other hand, and an accurate prediction of the count of objects on the other hand, is necessary.

In another particularly advantageous embodiment, during the training of the discriminator network,
  updated parameters that characterize the behavior of at least one convolutional layer in the first network are also updated in a corresponding convolutional layer in the second network, and/or
  updated parameters that characterize the behavior of at least one convolutional layer in the second network are also updated in a corresponding convolutional layer in the first network.

For example, such "weight sharing" may be accomplished by using parameters in the same memory space for setting the behavior of both the convolutional layer in the first network and the corresponding convolutional layer in the second network. The effect of this "weight sharing" is two-fold. First, memory consumption is reduced. Because neural networks, like the generator network and the discriminator network, are frequently implemented on GPUs, and GPU memory is much more expensive than normal general-purpose RAM, available GPU memory may become a limiting factor for the size of the network that may be implemented. Second, the "weight sharing" has been found to surprisingly have a regularizing effect on the discriminator network as a whole.

In a particularly advantageous embodiment of the present invention, the optimizing of the generator parameters and the discriminator parameters is performed with the goal of optimizing a value of a common loss function that comprises:
  a first contribution that becomes the lower the better the discriminator network recognizes training images;
  a second contribution that becomes the lower the better the discriminator network recognizes generated images; and
  a third contribution that becomes the lower the better the predicted count of objects matches the actual count of objects if the image inputted to the discriminator network is a training image, or matches the target count of objects if the image inputted to the discriminator network is a generated image.

As discussed above, the third contribution "gets to know" whether the image inputted to the discriminator network is a training image or a generated image. So the ability of the discriminator network to accurately predict the count of objects may be trained on the training images and used on the generated images. The contributions may be weighted relative to one another, so as to steer the importance of the count objective.

For example, the third contribution may be a norm of the difference between the actual or target count of objects on the one hand, and the predicted count of objects on the other hand. This norm may, for example, be an L1 norm or an L2 norm.

Advantageously, the generator parameters may be optimized with the goal of maximizing the value of the common loss function, and the discriminator parameters may optimized with the goal of minimizing the value of the common loss function. The goal of maximizing the value of the loss function will then mainly affect the second contribution: if the generator network gets better at producing "forgeries", this tends to make the performance of the discriminator network worse, so the second contribution increases.

In theory, the generator network could try to maximize the loss function by just outputting generated images which contain the wrong number of objects all the time. However, if the training of the generator network branched off towards this "solution", it is very probable that the generated images would become less realistic at the same time. So the second contribution to the loss function would become smaller because the discriminator network would more easily distinguish the generated images from the training images. Also, the training of the discriminator network to accurately predict the count of objects would be impaired if the discriminator network got "bad examples" for all generated images: it would then no longer accurately predict the actual count of objects in the training images.

Therefore, the net effect of the third contribution in the common loss function is that the discriminator network is trained on the training images to accurately predict the actual count of objects in the training image, while at the same time the generator network is trained to produce the desired number of object instances.

In a further particularly advantageous embodiment of the present invention, the providing of training images may specifically comprise:

transforming, by means of rotation, scaling and/or translation, a first training image into a new training image;
associating the new training image with the one or more actual counts of objects associated to the first training image; and
augmenting the set of training images with the new training image.

In this manner, if there is only little training material available for a particular count of object instances, the variability of this training material may be increased without requiring further manual effort for labeling.

As discussed before, a generator network may be modified to produce a target number of object instances merely by modifying the input layer to accommodate this target number. However, depending on the complexity of the generator network that is needed to produce realistic images of complex objects, the additional input of the target number may not pass through this generator network. For example, if the generator network has an encoder-decoder architecture with a "bottleneck" of a very low dimensionality in the latent space, a multi-class count vector might be under-represented in the latent space.

The present invention therefore also provides a method for manufacturing a generator network that is configured to generate images with multiple objects.

This method starts with providing a generator network that is configured to generate images with at least one instance of at least one type of object. Specifically, this generator network comprises at least one residual layer, convolutional layer, combination of a convolutional layer and a sampling layer, and/or fully connected layer.

The generator network is then modified by replacing the residual layer, convolutional layer, combination of a convolutional layer and a sampling layer, and/or fully connected layer with a dense block that comprises a sequence of multiple convolutional layers. Herein, the outcome of at least one of these convolutional layers is inputted into multiple succeeding convolutional layers in this sequence. These "skip connections" in the dense block preserve the count information, e.g., a multi-class count vector. At the same time, such a dense block affords at least the versatility and flexibility of the layer which it replaces, so that the performance of the generator network in terms of generating realistic images in the desired domain should be at least as good as it was before the modification.

As discussed before, the images with multiple object instances produced by the generator network are very useful and versatile training material for an image classifier. The present invention therefore also provides a method for training an image classifier.

This method starts with providing a generator network that is trained with the training method described above. Herein, "providing" specifically comprises that the generator network need not be trained by the same entity who performs the training of the image classifier. Rather, a second entity may acquire the fully trained generator from a first entity and then proceed with the training of the image classifier.

Using the generator network, classifier training images are generated. These classifier training images contain predetermined numbers of instances of objects. The objects are of predetermined types.

For each classifier training image, a label that is indicative of one or more classes to which the image classifier shall map this classifier training image is obtained using the predetermined types of objects and the predetermined numbers of instances. The concrete manner of determining the label from the types of objects and the numbers of instances depends on the use case at hand. For example, in a simple use case, the presence of at least one instance of a particular type of object may trigger this type of object (such as "car", "traffic sign" or "pedestrian") to go into the label. But the presence of multiple instances of particular objects may also give rise to labels of its own. For example, the presence of a large number of pedestrians may cause the classifier training image to be labelled "gathering", "group" or "crowd". The presence of multiple trees may cause the classifier training image to be labelled "alley" or "forest".

Training images are provided to the image classifier and mapped to classes. In particular, on top of the training images generated by the generator network as described above, the training images may also comprise other images (such as images that were actually captured using a physical camera) whose labels come from any other source (such as manual labeling). For example, the obtaining of the total set of training images may start with a number of manually labelled images that were actually acquired with a camera. This initial set of training images may then be augmented more and more with training images generated by the generator network.

A difference between the classes outputted by the image classifier and the labels associated with the training images is rated with a predetermined classifier cost function. Classifier parameters that characterize the behavior of the image classifier are optimized with the goal of improving said rating by the classifier cost function.

As discussed above, the use of the generator network allows for a much higher versatility and variability of the training material that is used for training the image classifier. Therefore, the image classifier is more likely to output a result that is appropriate for the application at hand in a greater spectrum of situations.

In accordance with an example embodiment of the present invention, it has also been found that, surprisingly, the training of the generator network as described above enables the generator network to infer reasonable spatial layouts that comprise the target counts of instances of target objects even though the training was not based on any spatial information. This may be exploited for automatically obtaining reasonable spatial layouts for machines.

The present invention therefore also relates to a method for obtaining a spatial layout of a machine that is to comprise a predetermined number of instances of one or more predetermined components.

In accordance with an example embodiment of the present invention, the method starts with the training of a generator network according to the generator network training method described above. Herein, the training images comprise images that show various counts of instances of the predetermined components. At least one actual count associated with each training image is a count of instances of a predetermined component in the respective training image.

A noise sample is drawn. This noise sample and the predetermined number of instances of the one or more components are supplied to the generator network. The generator network then outputs a generated image with the sought spatial layout.

Designing spatial layouts previously was a manual engineering task. The present method is not a mere automation of this manual task that yields the same end result without the manual effort. Rather, the spatial layouts generated by the method are entirely new spatial layouts that most probably would not have been produced by the manual engineering.

In particular, even if the available training images only show certain counts of instances of the desired objects, the generator network can interpolate and extrapolate this to further unseen counts. That is, in order to generate a spatial design with a certain desired count of instances of the object, training material that shows this count of instances is not required. Therefore, the required training of the generator network is not likely to obliterate the time that is saved because no more manual engineering is necessary.

Also, once the generator network has been trained, more spatial designs may be easily obtained just by drawing a new sample of noise and supplying this to the generator.

In a particularly advantageous embodiment of the present invention, the machine comprises an electric motor, and at least one of the predetermined components is a magnet. For example, the power of the electric motor may depend on a number of electromagnetic coils that are used to drive it. Based on previous versions of the motor with a lower number of magnets, a spatial layout with a higher number of magnets and a higher power may be extrapolated.

The methods described before may be wholly or partially computer-implemented. They may thus be embodied in a computer program that may be loaded on one or more computers. The invention therefore also provides a computer program with machine readable instructions that, when executed by one or more computers, cause the one or more computers to perform one or more methods as described above. In this respect, embedded systems and control units, e.g., for use in vehicles or other machines, that may execute program code are to be regarded as computers as well.

The present invention also provides a non-transitory computer-readable storage medium, and/or a download product, with the computer program. A download product is a digital product that may be delivered over a computer network, i.e., downloaded by a user of the computer network, that may, e.g., be offered for sale and immediate download in an online shop.

Also, one or more computers may be equipped with the computer program, with the non-transitory computer-readable storage medium, and/or with the download product, in accordance with example embodiments of the present invention.

BRIEF DESCRIPTION OF THE DRAWINGS

Below, the present invention is illustrated using Figures without any intention to limit the scope of the present invention.

DETAILED DESCRIPTION OF EXAMPLE EMBODIMENTS

Figure 1:
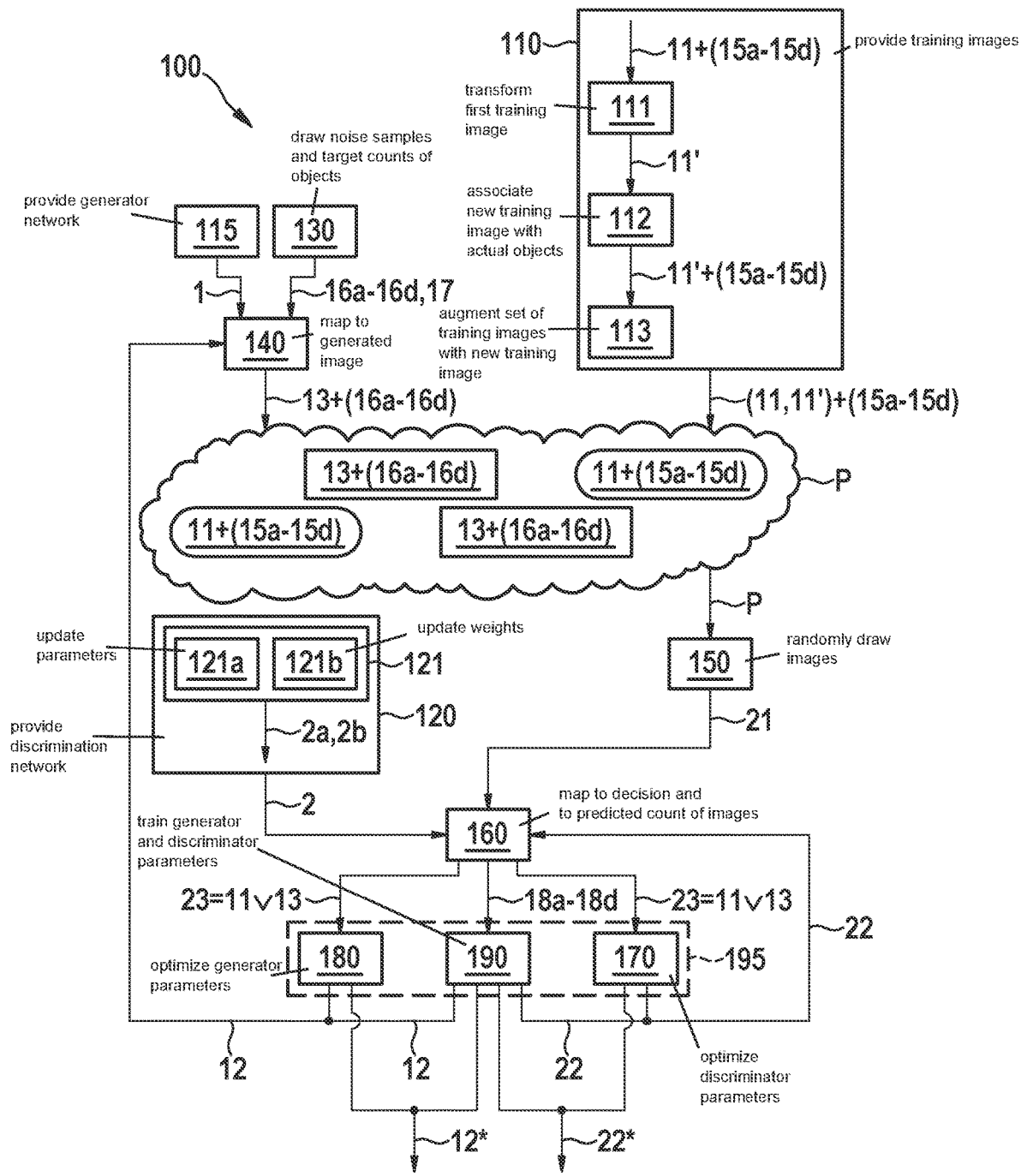
FIG. 1 shows an exemplary embodiment of the method 100 for training a generator network, in accordance with the present invention.

FIG. 1 is a schematic flow chart of the method 100 for training a generator network 1.

In step 110, a set of training images 11 is provided. For each training image 11, at least one actual count 15a-15d of objects 14a-14d that the respective training image 11 contains is provided.

In particular, according to block 111, a first training image 11 may be transformed, by means of rotation, scaling and/or translation, into a new training image 11'. According to block 112, this new training image 11' may be associated with the one or more actual counts 15a-15d of objects 14a-14d already associated to the first training image 11. According to block 113, the set of training images 11 may be augmented with the new training image 11'.

In step 115, the generator network 1 is provided. This generator network 1 is configured to map a combination of a noise sample 17 and at least one target count 16a-16d of objects 14a-14d to a generated image 13. In step 130, noise samples 17 and target counts 16a-16d of objects 14a-14d are drawn. In step 140, these noise samples 17 and target counts 16a-16d are mapped by the generator network 1 to generated image 13.

The generated images 13, to which the target counts 16a-16d of objects 14a-14d are associated, are pooled in a pool P with the training images 11, to which the actual counts 15a-15d of objects 14a-14d are associated.

In step 120, a discriminator network 2 is provided. This discriminator network 2 is configured to map an image 21 to a combination of: a decision 23 whether the image is a training image 11 or a generated image 13 produced by the generator network 1, and at least one predicted count 18a-18d of objects 14a-14d in the image 21.

According to block 121, the discriminator network 2 may comprise a first network 2a that outputs the decision 23 and a second network 2b that outputs the predicted count 18a-18d of objects 14a-14d. According to block 121a, updated parameters (weights) of the first network 2a may be updated in the corresponding place in the second network 2b as well.

According to block 121b, updated weights of the second network 2b may be updated in the corresponding place in the first network 2a as well.

In step 150, images 21 are randomly drawn from the pool P. These randomly drawn images 21 are supplied to the discriminator network 2, and mapped to the decision 23 and to the predicted count 18a-18d of objects 14a-14d, in step 160.

In step 170, discriminator parameters 22 that characterize the behavior of the discriminator network 2 are optimized with the goal of improving the accuracy with which the discriminator network 2 distinguishes between generated images 13 and training images 11. In step 180, generator parameters 12 that characterize the behavior of the generator network 1 are optimized with the goal of deteriorating said accuracy.

Also, in step 190, both the generator parameters 12 and the discriminator parameters 22 are trained with the goal of improving the match between the predicted count 18a-18d of objects 14a-14d on the one hand, and the actual 15a-15d or target 16a-16d count of objects 14a-14d on the other hand.

The finally obtained, fully trained state of the generator parameters 12 is labelled with the reference sign 12*. The finally obtained, fully trained state of the discriminator parameters 22 is labelled with the reference sign 22*.

According to block 195, a common loss function may be used for the optimizations 170, 180 and 190.

FIGS. 2a-2d show examples of generated images 13 produced by a generator network 1 that has been trained on training images 11 containing handwritten digits from the conventional MNIST dataset. In the examples shown in FIGS. 2a-2d, instances of four objects 14a (digit 6), 14b (digit 9), 14c (digit 1) and 14d (digit 2) are shown. The images 13 were generated by the generator network from a noise sample 17 and a multi-class count vector that, for each object 14a-14d, gives the target count 16a-16d of instances that are to appear in the generated image 13.

Figure 2A:
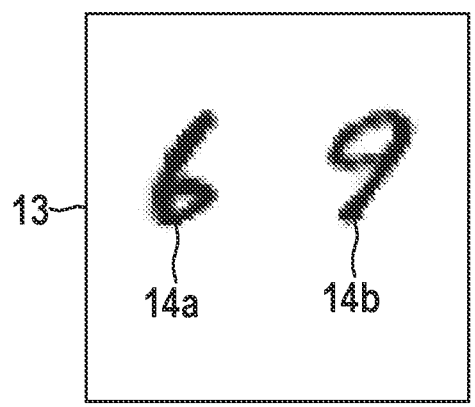
FIGS. 2a-2d show exemplary images produced by the generator network based on training images with handwritten digits from the MNIST dataset.
Figure 2B:
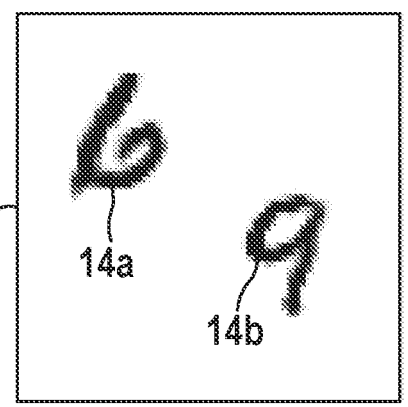

FIGS. 2a and 2b show two generated images 13 that each comprise one instance of object 14a (digit 6) and one instance of object 14b (digit 9). Because FIG. 2b was generated from a noise sample 17 different from the noise sample 17 with which FIG. 2a was generated, the digits look differently and are located in different places than in FIG. 2a.

Figure 2C:
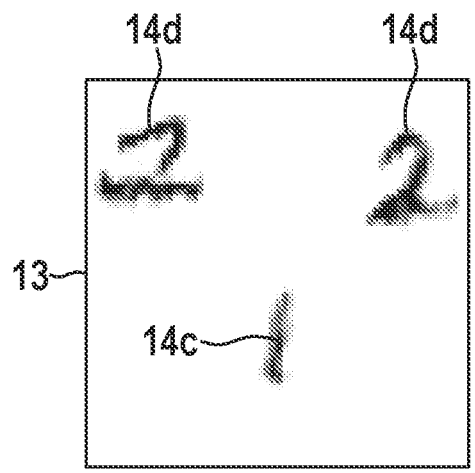
Figure 2D:
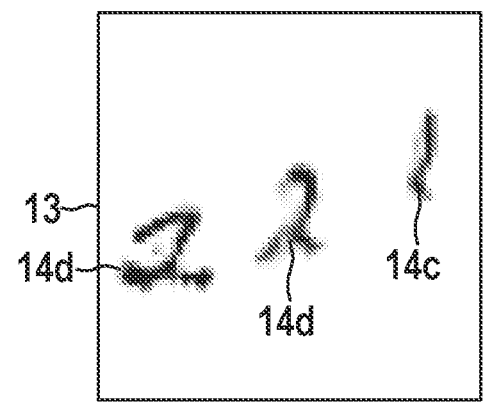

FIGS. 2c and 2d show two generated images 13 that each comprise one instance of object 14c (digit 1) and two instances of object 14d (digit 2). Again, using a fresh noise sample 17 causes new variations of the digits to be generated and also causes the digits to move to new locations.

Figure 3:
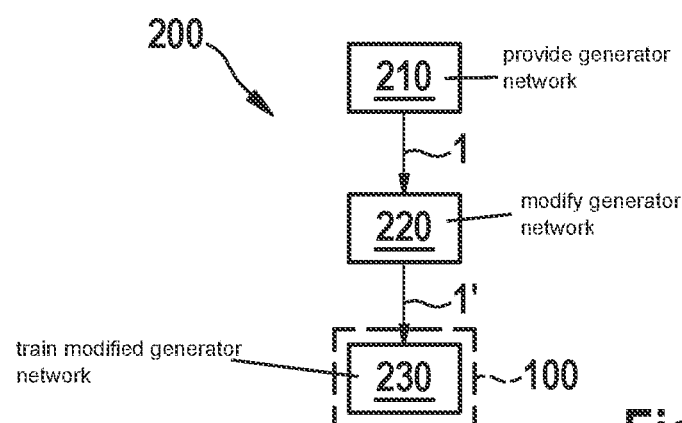
FIG. 3 shows an exemplary embodiment of the method 200 for manufacturing a generator network 1, in accordance with the present invention.

FIG. 3 is a schematic flow chart of an exemplary embodiment of the method 200 for manufacturing a generator network 1, in accordance with the present invention. In step 210, a generator network 1 that is already configured to generate realistic images, but not yet configured to accommodate a request for a certain count 16a-16d of instances of objects 14a-14d, is provided. In step 220, this generator network 1 is modified by replacing a previously present layer with a dense block with multiple convolutional layers and "skip connections" between convolutional layers that are not adjacent. In step 230, this modified generator network 1' is trained with the method 100 described above.

Figure 4:
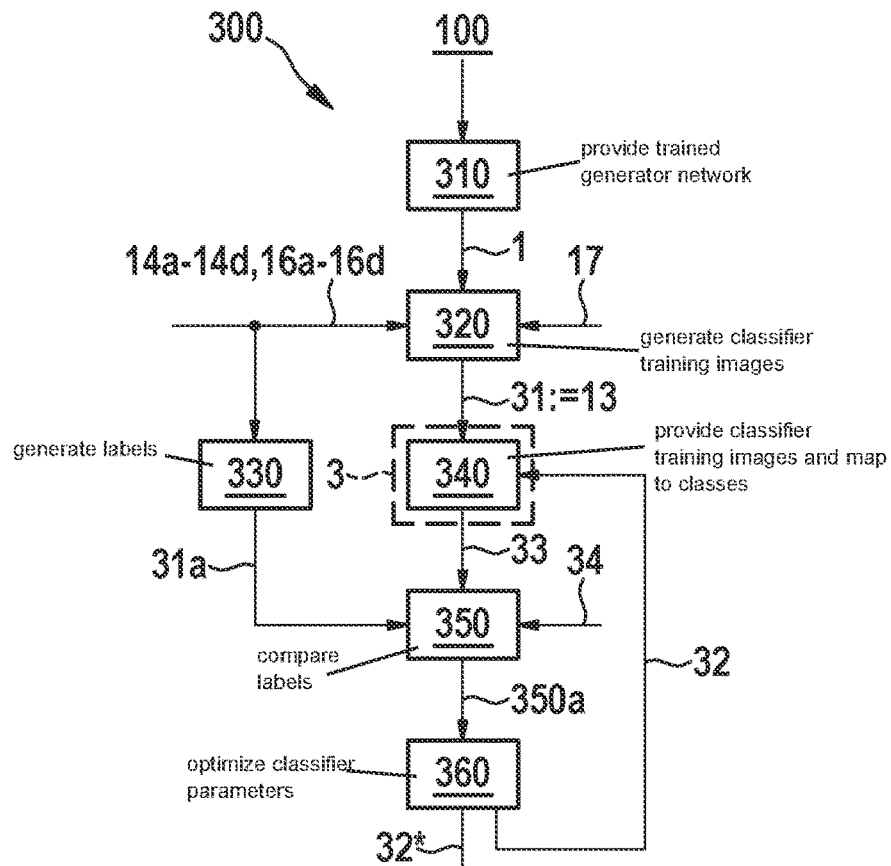
FIG. 4 shows an exemplary embodiment of the method 300 for training an image classifier 3, in accordance with the present invention.

FIG. 4 is a schematic flow chart of an exemplary embodiment of the method 300 for training an image classifier 3.

In step 310, a generator network 1 that is trained with the method 100 describe above is provided. In step 320, this generator network 1 is used to generate classifier training images 31 that contain predetermined numbers 16a-16d of instances of objects 14a-14d. Akin to FIG. 1, on top of the desired number 16a-16d of instances, a noise sample 17 is used to generate each image 13 that is then used as classifier training image 31.

The objects 14a-14d are of a predetermined type. These predetermined types and the corresponding numbers 16a-16d of instances are used in step 330 to generate a label 31a for each classifier training image 31. The label 31a is indicative of one or more classes 33 to which the image classifier 3 shall map this classifier training image 31.

In step 340, the classifier training images 31 are provided to the image classifier 3, and mapped to classes 33 by the image classifier 3. These classes are compared with the labels 31a in step 350, and the difference between the classes 33 and the corresponding labels 31a is rated with a classifier cost function 34. Classifier parameters 32 that characterize the behavior of the image classifier 3 are optimized in step 360 with the goal of improving the rating 350a by the classifier cost function 34. The finally obtained, fully trained state of the classifier parameters 32 is labelled with the reference sign 32*.

Figure 5:
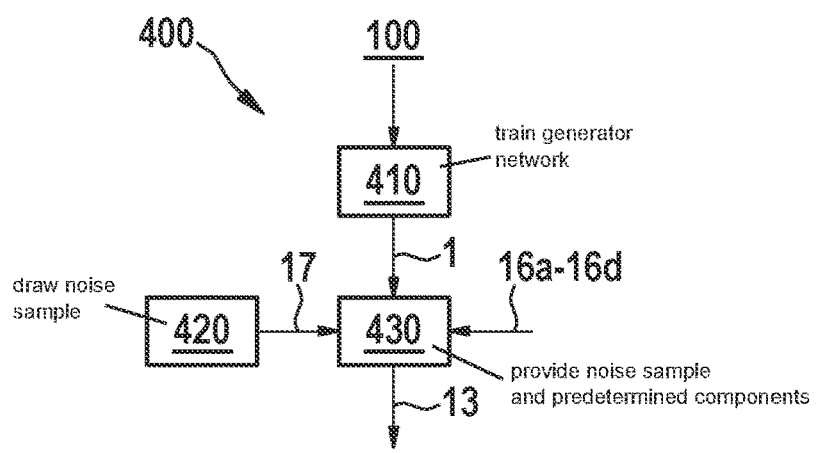
FIG. 5 shows an exemplary embodiment of the method 400 for obtaining a spatial layout of a machine, in accordance with the present invention.

FIG. 5 is a schematic flow chart of an exemplary embodiment of the method 400 for obtaining a spatial layout of a machine. The machine is to comprise a predetermined number 16a-16d of instances of one or more predetermined components.

In step 410, a generator network 1 is trained with the training method 100 described above. The used the training images 11 comprise images that show various counts of instances of the predetermined components. At least one actual count 15a-15d associated with each training image 11 is a count of instances of a predetermined component in the respective training image 11.

In step 420, a noise sample 17 is drawn. In step 430, the noise sample 17 and the predetermined number 16a-16d of instances of the predetermined components are supplied to the generator network 1. In this manner, a generated image 13 with the sought spatial layout is obtained.

What is claimed is:

1. A method for training a generator network that is configured to generate images with multiple objects, comprising the following steps:
   providing a set of training images and, for each respective training image of the training images, at least one actual count of objects that the respective training image contains;
   providing a generator network that is configured to map a combination of a noise sample and at least one target count of objects to a generated image;
   providing a discriminator network that is configured to map an image to a combination of: a decision of whether the image is a training image or a generated image produced by the generator network, and at least one predicted count of objects in the image;
   drawing noise samples and target counts of objects;
   mapping, by the generator network, the noise samples and target counts of objects to generated images;
   randomly drawing images from a pool including the generated images and the training images;
   supplying the randomly drawn images to the discriminator network, the discriminator network mapping each respective drawn image of the randomly drawn images to a combination of: a decision whether the respective drawn image is a training image or a generated image, and at least one predicted count of objects in the respective drawn image;
   optimizing discriminator parameters that characterize a behavior of the discriminator network with a goal of improving an accuracy with which the discriminator network distinguishes between generated images and training images;
   optimizing generator parameters that characterize a behavior of the generator network with a goal of deteriorating the accuracy; and
   further optimizing both the generator parameters and the discriminator parameters with a goal of improving a match between the predicted count of objects on the one hand, and the actual count or the target count of objects on the other hand.

2. The method of claim 1, wherein the provided discriminator network includes:
   a first network including a plurality of convolutional layers and a classification layer that is configured to map an outcome of the convolutional layers of the first network to the decision of whether an image inputted to the discriminator network is a training image or a generated image; and
   a second network including a plurality of convolutional layers and a regression layer that is configured to map an outcome of the convolutional layers of the second network to the at least one predicted count of objects in the image.

3. The method of claim 2, wherein, during the training of the discriminator network:
updated parameters that characterize behavior of at least one convolutional layer in the first network are also updated in a corresponding convolutional layer in the second network, and/or
updated parameters that characterize behavior of at least one convolutional layer in the second network are also updated in a corresponding convolutional layer in the first network.

4. The method of claim 1, wherein the optimizing of the generator parameters and the discriminator parameters is performed with a goal of optimizing a value of a common loss function that comprises:
a first contribution that becomes the lower the better the discriminator network recognizes training images;
a second contribution that becomes the lower the better the discriminator network recognizes generated images; and
a third contribution that becomes the lower the better the predicted count of objects matches the actual count of objects if the image inputted to the discriminator network is a training image, or matches the target count of objects if the image inputted to the discriminator network is a generated image.

5. The method of claim 4, wherein the third contribution is a norm of the difference between the actual or the target count of objects on the one hand, and the predicted count of objects on the other hand.

6. The method of claim 4, wherein the generator parameters are optimized with a goal of maximizing the value of the common loss function, and the discriminator parameters are optimized with the goal of minimizing the value of the common loss function.

7. The method of claim 1, wherein the actual count of objects, the target count of objects, and the predicted count of objects are multi-class count vectors that include separate counts for multiple classes of objects.

8. The method of claim 1, wherein the providing of training images includes:
transforming, by means of rotation and/or scaling and/or translation, a first training image into a new training image;
associating the new training image with the at least one actual count of objects associated to the first training image; and
augmenting the set of training images with the new training image.

9. A method for manufacturing a generator network that is configured to generate images with multiple objects, comprising the following steps:
providing a generator network that is configured to generate images with at least one instance of at least one type of object, wherein the generator network includes at least one residual layer, and/or convolutional layer, and/or combination of a convolutional layer and a sampling layer, and/or fully connected layer;
modifying the generator network by replacing the residual layer, and/or convolutional layer, and/or combination of convolutional layer and sampling layer, and/or fully connected layer, with a dense block that includes a sequence of multiple convolutional layers, wherein an outcome of at least one of the sequence of multiple convolutional layers is inputted into multiple succeeding convolutional layers in the sequence; and
training the modified generator network, wherein the modified generator network is configured to map a combination of a noise sample and at least one target count of objects to a generated image by:
providing a set of training images and, for each respective training image of the training images, at least one actual count of objects that the respective training image contains,
providing a discriminator network that is configured to map an image to a combination of: a decision of whether the image is a training image or a generated image produced by the modified generator network, and at least one predicted count of objects in the image,
drawing noise samples and target counts of objects,
mapping, by the modified generator network, the noise samples and target counts of objects to generated images,
randomly drawing images from a pool including the generated images and the training images,
supplying the randomly drawn images to the discriminator network, the discriminator network mapping each respective drawn image of the randomly drawn images to a combination of: a decision whether the respective drawn image is a training image or a generated image, and at least one predicted count of objects in the respective drawn image;
optimizing discriminator parameters that characterize a behavior of the discriminator network with a goal of improving an accuracy with which the discriminator network distinguishes between generated images and training images;
optimizing generator parameters that characterize a behavior of the modified generator network with a goal of deteriorating the accuracy; and
further optimizing both the generator parameters and the discriminator parameters with a goal of improving a match between the predicted count of objects on the one hand, and the actual count or the target count of objects on the other hand.

10. A method for training an image classifier, comprising the following steps:
providing a trained generator network by:
providing a set of training images and, for each respective training image of the training images, at least one actual count of objects that the respective training image contains;
providing a generator network that is configured to map a combination of a noise sample and at least one target count of objects to a generated image;
providing a discriminator network that is configured to map an image to a combination of: a decision of whether the image is a training image or a generated image produced by the generator network, and at least one predicted count of objects in the image;
drawing noise samples and target counts of objects;
mapping, by the generator network, the noise samples and target counts of objects to generated images;
randomly drawing images from a pool including the generated images and the training images;
supplying the randomly drawn images to the discriminator network, the discriminator network mapping each respective drawn image of the randomly drawn images to a combination of: a decision whether the respective drawn image is a training image or a generated image, and at least one predicted count of objects in the respective drawn image;
optimizing discriminator parameters that characterize a behavior of the discriminator network with a goal of improving an accuracy with which the discriminator network distinguishes between generated images and training images;
optimizing generator parameters that characterize a behavior of the generator network with a goal of deteriorating the accuracy; and
further optimizing both the generator parameters and the discriminator parameters with a goal of improving a match between the predicted count of objects on the one hand, and the actual count or the target count of objects on the other hand;
generating, using the trained generator network, classifier training images that contain predetermined numbers of instances of objects, wherein the objects are of predetermined types;
obtaining, for each classifier training image of the classifier training images, using the predetermined types of objects and the predetermined numbers of instances, a label that is indicative of one or more classes to which the image classifier shall map the classifier training image;
providing the classifier training images to the image classifier, thereby mapping the classifier training images to classes;
rating a difference between the mapped classes and the labels associated with the training images with a predetermined classifier cost function; and
optimizing classifier parameters that characterize a behavior of the image classifier with the goal of improving the rating by the classifier cost function.

11. A method for obtaining a spatial layout of a machine that is to comprise a predetermined number of instances of one or more predetermined components, comprising the following steps:
training a generator network by:
providing a set of training images and, for each respective training image of the training images, at least one actual count of objects that the respective training image contains,
providing the generator network, the generator network being configured to map a combination of a noise sample and at least one target count of objects to a generated image,
providing a discriminator network that is configured to map an image to a combination of: a decision of whether the image is a training image or a generated image produced by the generator network, and at least one predicted count of objects in the image;
drawing noise samples and target counts of objects,
mapping, by the generator network, the noise samples and target counts of objects to generated images,
randomly drawing images from a pool including the generated images and the training images,
supplying the randomly drawn images to the discriminator network, the discriminator network mapping each respective drawn image of the randomly drawn images to a combination of: a decision whether the respective drawn image is a training image or a generated image, and at least one predicted count of objects in the respective drawn image,
optimizing discriminator parameters that characterize a behavior of the discriminator network with a goal of improving an accuracy with which the discriminator network distinguishes between generated images and training images,
optimizing generator parameters that characterize a behavior of the generator network with a goal of deteriorating the accuracy, and
further optimizing both the generator parameters and the discriminator parameters with a goal of improving a match between the predicted count of objects on the one hand, and the actual count or the target count of objects on the other hand;
wherein the training images include images that show various counts of instances of the predetermined components, and wherein the at least one actual count associated with each of the training images is a count of instances of a predetermined component in the respective training image;
drawing a noise sample; and
supplying the drawn noise sample and the predetermined number of instances of the predetermined components to the generator network, thereby obtaining a generated image with the spatial layout.

12. The method of claim 11, wherein the machine includes an electric motor and wherein at least one of the predetermined components is a magnet.

13. A non-transitory computer-readable storage medium on which is stored a computer program for training a generator network that is configured to generate images with multiple objects, the computer program, when executed by one or more computer, causing the one or more computers to perform the following steps:
providing a set of training images and, for each respective training image of the training images, at least one actual count of objects that the respective training image contains;
providing a generator network that is configured to map a combination of a noise sample and at least one target count of objects to a generated image;
providing a discriminator network that is configured to map an image to a combination of: a decision of whether the image is a training image or a generated image produced by the generator network, and at least one predicted count of objects in the image;
drawing noise samples and target counts of objects;
mapping, by the generator network, the noise samples and target counts of objects to generated images;
randomly drawing images from a pool including the generated images and the training images;
supplying the randomly drawn images to the discriminator network, the discriminator network mapping each respective drawn image of the randomly drawn images to a combination of: a decision whether the respective drawn image is a training image or a generated image, and at least one predicted count of objects in the respective drawn image;
optimizing discriminator parameters that characterize a behavior of the discriminator network with a goal of improving an accuracy with which the discriminator network distinguishes between generated images and training images;
optimizing generator parameters that characterize a behavior of the generator network with a goal of deteriorating the accuracy; and
further optimizing both the generator parameters and the discriminator parameters with a goal of improving a match between the predicted count of objects on the one hand, and the actual count or the target count of objects on the other hand.

14. One or more computers configured to train a generator network that is configured to generate images with multiple objects, the one or more computers configured to:
- provide a set of training images and, for each respective training image of the training images, at least one actual count of objects that the respective training image contains;
- provide a generator network that is configured to map a combination of a noise sample and at least one target count of objects to a generated image;
- provide a discriminator network that is configured to map an image to a combination of: a decision of whether the image is a training image or a generated image produced by the generator network, and at least one predicted count of objects in the image;
- draw noise samples and target counts of objects;
- map, by the generator network, the noise samples and target counts of objects to generated images;
- randomly draw images from a pool including the generated images and the training images;
- supply the randomly drawn images to the discriminator network, the discriminator network mapping each respective drawn image of the randomly drawn images to a combination of: a decision whether the respective drawn image is a training image or a generated image, and at least one predicted count of objects in the respective drawn image;
- optimize discriminator parameters that characterize a behavior of the discriminator network with a goal of improving an accuracy with which the discriminator network distinguishes between generated images and training images;
- optimize generator parameters that characterize a behavior of the generator network with a goal of deteriorating the accuracy; and
- further optimize both the generator parameters and the discriminator parameters with a goal of improving a match between the predicted count of objects on the one hand, and the actual count or the target count of objects on the other hand.

* * * * *